(12) United States Patent
Dillon et al.

(10) Patent No.: US 7,444,785 B2
(45) Date of Patent: Nov. 4, 2008

(54) BOTTOM PAD/BUMPER ASSEMBLY FOR LOADING DOCKS WITH LEVELER

(75) Inventors: Mark Dillon, Upper Sandusky, OH (US); Thomas R. Brockman, Kenton, OH (US); Michael Pilgrim, Hartland, WI (US)

(73) Assignee: Fairborn USA, Inc., Upper Sandusky, OH (US)

( * ) Notice: Subject to any disclaimer, the term of this patent is extended or adjusted under 35 U.S.C. 154(b) by 662 days.

(21) Appl. No.: 10/658,759

(22) Filed: Sep. 10, 2003

(65) Prior Publication Data

US 2005/0053427 A1 Mar. 10, 2005

(51) Int. Cl.
*E01D 18/00* (2006.01)
(52) U.S. Cl. ....................... 52/173.2; 14/71.1
(58) Field of Classification Search ............... 52/73, 52/173.2, 274, 177, 173, 173.1; 14/69.5, 14/71.1, 71.5
See application file for complete search history.

(56) References Cited

U.S. PATENT DOCUMENTS

| | | | | |
|---|---|---|---|---|
| 3,411,168 A * | 11/1968 | Hecker, Jr. | ................... | 14/71.3 |
| 3,665,997 A * | 5/1972 | Smith et al. | ................ | 52/173.2 |
| 3,806,976 A * | 4/1974 | Yoon | ............................ | 14/71.3 |
| 4,062,157 A * | 12/1977 | Potthoff | ....................... | 52/173.2 |
| 4,213,279 A * | 7/1980 | Layne | ........................ | 52/173.2 |
| 4,349,992 A * | 9/1982 | Layne | ........................ | 52/173.2 |
| 4,682,382 A * | 7/1987 | Bennett | ....................... | 14/71.3 |
| 4,873,800 A * | 10/1989 | Frommelt et al. | ........... | 52/173.2 |
| 5,442,825 A * | 8/1995 | Hahn et al. | ................... | 14/71.1 |
| 5,661,934 A * | 9/1997 | Weisflog | ..................... | 52/173.2 |
| 6,227,132 B1 * | 5/2001 | Garcia | ......................... | 114/197 |
| 6,405,397 B1 * | 6/2002 | Alexander | ................... | 14/71.7 |
| 6,497,076 B1 * | 12/2002 | van de Wiel et al. | ........ | 52/173.2 |
| 6,654,976 B2 * | 12/2003 | Digmann et al. | ............. | 14/69.5 |
| 6,883,198 B2 * | 4/2005 | Alexander | ................... | 14/71.5 |
| 7,044,474 B2 * | 5/2006 | Eungard | ..................... | 277/650 |
| 2002/0152562 A1 * | 10/2002 | Ashelin et al. | ............... | 14/71.1 |
| 2002/0170127 A1 * | 11/2002 | Alexander | ................... | 14/71.3 |
| 2003/0005530 A1 * | 1/2003 | Digmann et al. | ............. | 14/69.5 |
| 2004/0134139 A1 * | 7/2004 | Busch et al. | ................ | 52/173.2 |

FOREIGN PATENT DOCUMENTS

EP 0 450 365 A1 * 10/1991

* cited by examiner

*Primary Examiner*—Gay Ann Spahn
(74) *Attorney, Agent, or Firm*—Birch, Stewart, Kolasch & Birch, LLP

(57) ABSTRACT

A bottom pad assembly for sealing a bottom opening formed when a vehicle is parked adjacent to a loading dock includes a first mounting bracket positioned adjacent to a first end of a dock opening. A second mounting bracket is positioned adjacent to second end of a dock opening. The second end is displaced a predetermined distance relative to the first end. A bottom pad extends between the first mounting bracket and the second mounting bracket for engaging a rear portion of a vehicle parked adjacent to a loading dock. A clearance space is formed between the bottom pad and a loading dock. The clearance space selectively receives a portion of a leveler for facilitating the loading and unloading of a vehicle when the vehicle is full and the leveler can not be lowered into the vehicle.

17 Claims, 4 Drawing Sheets

BOTTOM PAD/BUMPER ASSEMBLY FOR LOADING DOCKS WITH LEVELER

BACKGROUND OF THE INVENTION

1. Field of the Invention

A bottom pad assembly for sealing a bottom opening formed when a vehicle is parked adjacent to a loading dock includes a clearance space formed between the bottom pad and a loading dock wherein the clearance space selectively receives a portion of a leveler for facilitating the loading and unloading of a vehicle when the vehicle is full and the leveler is not able to be lowered into the vehicle.

2. Description of Background Art

Loading docks normally include side pads seals and a top pad seal for sealing a space that occurs when a vehicle such as a trailer is parked at a loading dock for loading or unloading. However, a bottom pad was not previously provided in view of the fact that individuals would be traversing the gap between the vehicle and the dock opening. If foam material is disposed in the gap between the vehicle and the dock opening the material would not be suitable to support an individual walking across the gap or for a handcart to traverse the gap during loading or unloading of the vehicle.

Dock boards have been used to span the gap between the dock opening and the vehicle to facilitate ingress and egress from the vehicle. The dock boards normally include guides that project from a lower surface of the dock boards for preventing the dock boards from sliding. Thus, it was not possible to seal the bottom opening of the loading dock.

SUMMARY AND OBJECTS OF THE INVENTION

It is an object of the present invention to provide a bottom pad assembly for sealing the gap formed between a floor of a vehicle and the floor of a dock opening when a vehicle is parked adjacent to the loading dock.

Another object of the present invention is to provide a clearance space disposed between the floor of the dock opening and the bottom pad for receiving a portion of a leveler for facilitating the loading and unloading of the vehicle when the vehicle is full and the leveler is not able to be lowered into the vehicle.

These and other objects of the present invention are achieved by providing a bottom pad assembly for sealing a gap or bottom opening formed when a vehicle is parked adjacent to a loading dock that includes a first mounting bracket positioned adjacent to a first end of a dock opening. A second mounting bracket is positioned adjacent to a second end of the dock opening. The second end is displaced a predetermined distance relative to the first end. A bottom pad extends between the first mounting bracket and the second mounting bracket for engaging a rear portion of a vehicle parked adjacent to a loading dock. A clearance space is formed between the bottom pad and a loading dock. The clearance space selectively receives a portion of a leveler for facilitating the loading and unloading of a vehicle when the vehicle is full and the leveler is not able to be lowered into the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
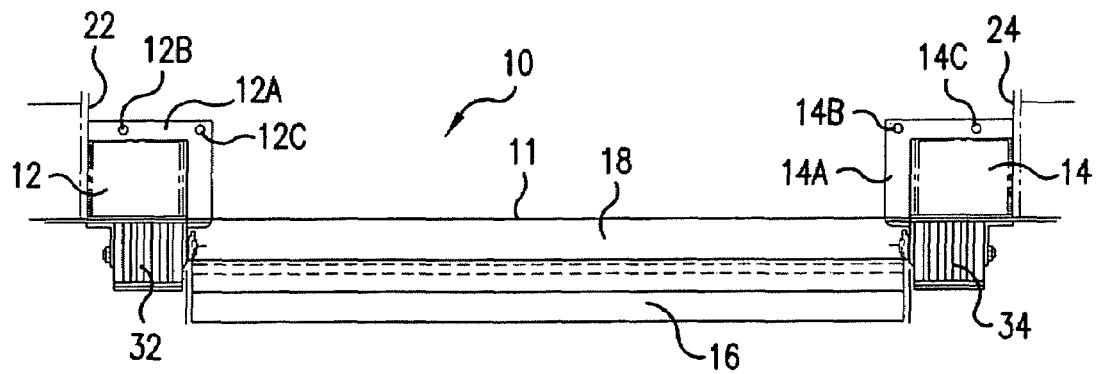
FIG. 1 is a plan view illustrating a bottom pad assembly disposed adjacent to a floor of a dock opening.
Figure 2:
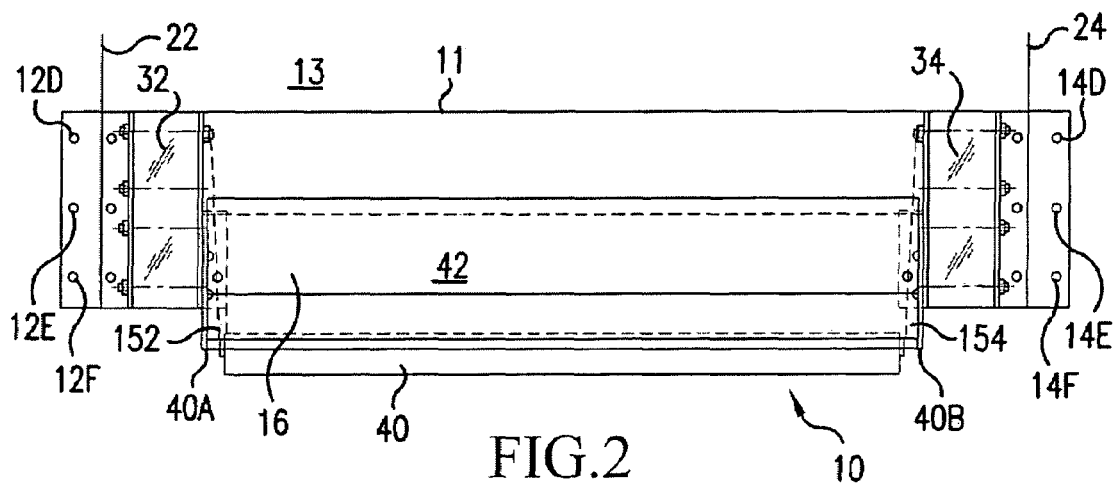
FIG. 2 is a front elevational view illustrating the bottom pad assembly disposed adjacent to a floor of a dock opening.
Figure 3:
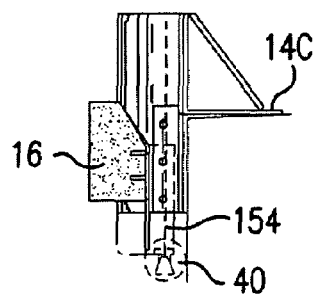
FIG. 3 is a right side view illustrating the movable relationship of the bottom pad assembly relative to a mounting bracket.

As illustrated in FIGS. 1-3, a bottom pad assembly 10 is mounted to a loading dock 11 so as to seal a gap or bottom opening that is formed when a vehicle, for example a trailer or a truck, is parked adjacent to the loading dock 11. A first mounting bracket 12 is positioned adjacent to a first end 22 of a dock opening 13. A second mounting bracket 14 is positioned adjacent to a second end 24 of the dock opening 13. The second end 24 of the dock opening 13 is displaced a predetermined distance relative to the first end 22.

The width dimensions of the bottom pad assembly 10 may be constructed to accommodate any size loading dock 11. The drawings of the present application do not limit the invention to any particular dimensions. The bottom pad assembly 10 may be as wide or as narrow as necessary to accomplish the intended purpose.

A bottom pad 16 extends between the first mounting bracket 12 and the second mounting bracket 14 for engaging a rear portion of a vehicle parked adjacent to the loading dock 11. A clearance space 18 is formed between the bottom pad 16 and the loading dock 11. The clearance space 18 selectively receives a portion of a leveler 130 for facilitating the loading and unloading of the vehicle when the vehicle is full and the leveler 130 is not able to be lowered into the vehicle.

Figure 4:
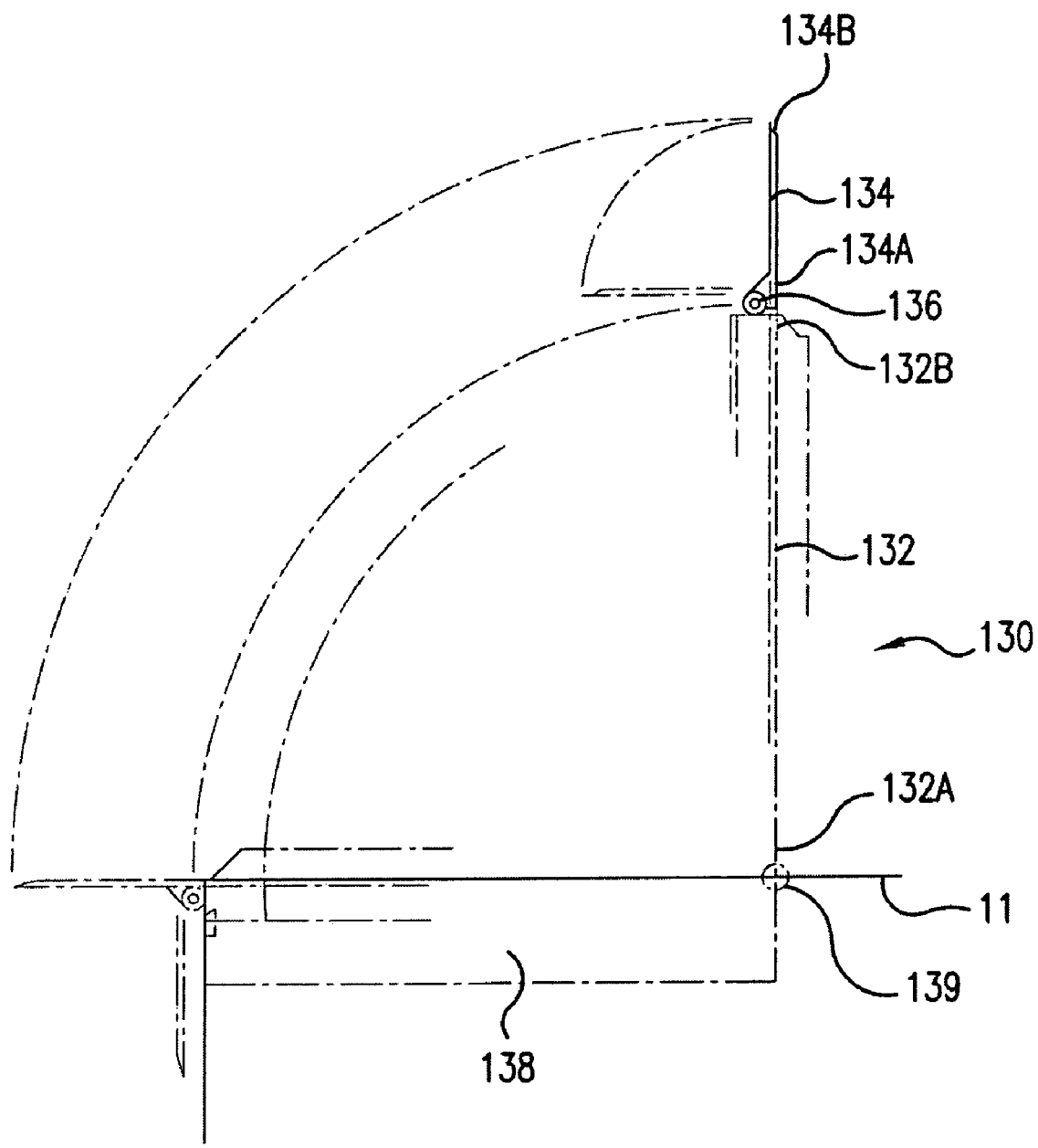
FIG. 4 is a side view illustrating a leveler that is movably mounted relative to the dock opening to permit a distal end of the leveler to be lowered into a vehicle during loading and unloading.

More specifically, as illustrated in FIG. 4, the leveler 130 includes a ramp portion 132 and a lip portion 134. A pit 138 is formed in the floor of the loading dock 11 for accommodating the leveler 130 and an actuating mechanism, not illustrated, for raising and lowering the leveler 130. The actuating mechanism may be pneumatic or hydraulic or a mechanical mechanism for selectively raising or lowering the leveler 130 depending on the height of the vehicle being loaded or unloaded.

As illustrated in FIG. 4, the ramp portion 132 includes a proximal end 132A that is pivotally mounted at 139 to the floor of the loading dock 11. The lip portion 134 includes a proximal end 134A that is hinged at 136 to a distal end 132B of the ramp portion 132. The lip portion 134 includes a distal end 134A that is designed to be positioned within a vehicle during loading or unloading. FIG. 4 illustrates in solid lines the leveler 130 in a vertical position for storage during non-use. As illustrated in broken lines, the leveler 130 may be lowered to extend along an upper portion of the pit 138 during normal operation with the lip portion 134 projecting therefrom to extend into the vehicle for spanning the gap or bottom opening formed between the vehicle and the loading dock 11.

The actuating mechanism disposed within the pit 138 is operatively attached to the ramp portion 132 for adjusting the height of the ramp portion 132 relative to the height of a particular vehicle. The actuating mechanism is also operatively attached to the lip portion 134 for selectively extending the lip portion 134 to be extended within a vehicle and for imparting movement to the lip portion 134 to be angled at approximately ninety degrees relative to the ramp portion 132 when it is desired to permit the lip portion 134 to be positioned within the clearance space 18.

During normal operation of the leveler 130 a problem arises when the vehicle is full and the vehicle needs to be unloaded or the vehicle is being loaded and workers are attempting to load the rear of the vehicle. During these times, the lip portion 134 cannot extend into the vehicle. As illustrated in FIG. 4, in an alternative position illustrated in broken lines, the actuation mechanism may be activated to impartment movement to the lip portion 134 so that the lip portion 134 projects downwardly into the clearance space 18 to permit the lip portion 134 to be out of the way.

The bottom pad assembly 10 of the present invention permits the gap or space between the vehicle and the loading dock 11 to be sealed while providing a clearance space 18 to permit the lip portion 134 of the leveler 130 to extend into the clearance space 18 during the initial unloading or final loading of a full vehicle.

As illustrated in FIGS. 1 and 2, the first mounting bracket 12 includes a first flange 12A mounted on the dock 11 by means of bolts 12B-12F. The second mounting bracket 14 includes a second flange 14A mounted on the dock 11 by means of bolts 14B-14F. The bottom pad 16 extends between the first mounting bracket 12 and the second mounting bracket 14 and is adjustable relative to said first flange 12A and the second flange 14A for permitting the bottom pad 16 to be raised and lowered relative to the height of the floor of the vehicle parked adjacent to a loading dock 11.

A first bumper 32 is mounted adjacent to the first mounting bracket 12. A second bumper 34 is mounted adjacent to the second mounting bracket 14. The bottom pad 16 extends outwardly from the first bumper 32 and second bumpers 34 for providing a resilient engagement with the vehicle parked adjacent to a loading dock for sealing the space or gap disposed therebetween.

The bottom pad 16 may be constructed on any suitable foam material. In a preferred embodiment, the foam material is covered with a fabric to protect the foam material in a waterproof environment during normal use.

Figure 5:
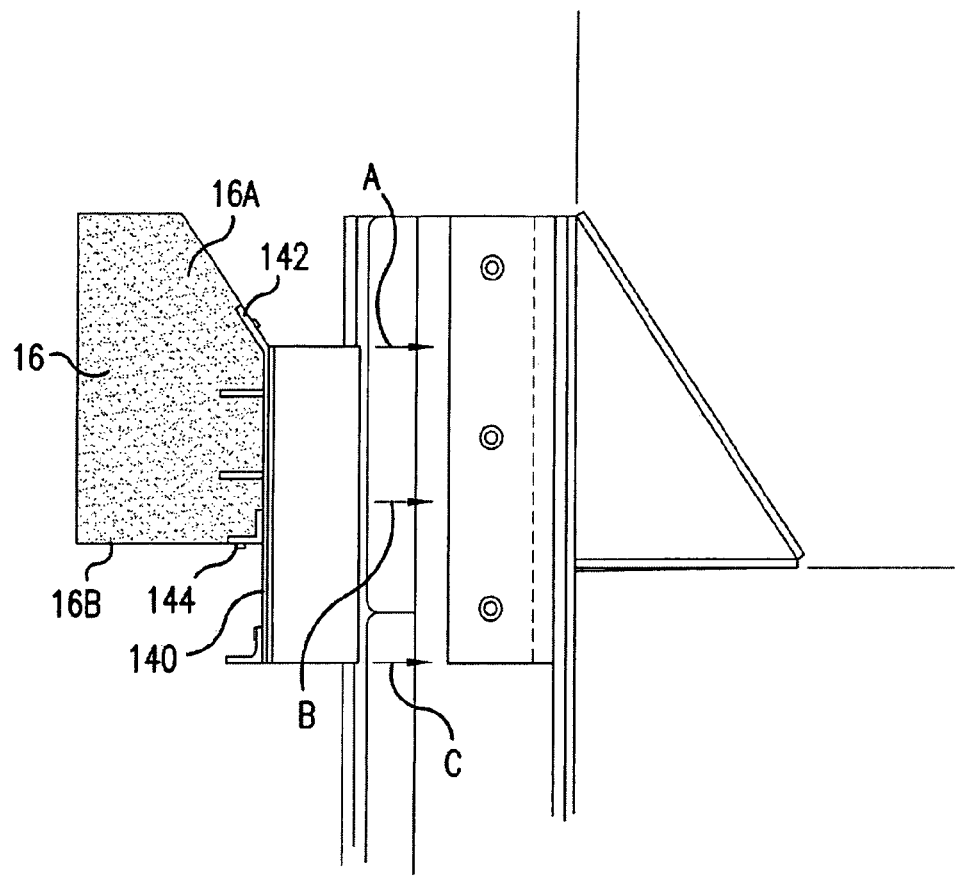
FIG. 5 is an enlarged right side view illustrating the bottom pad being disengaged from the mounting bracket.
Figure 6:
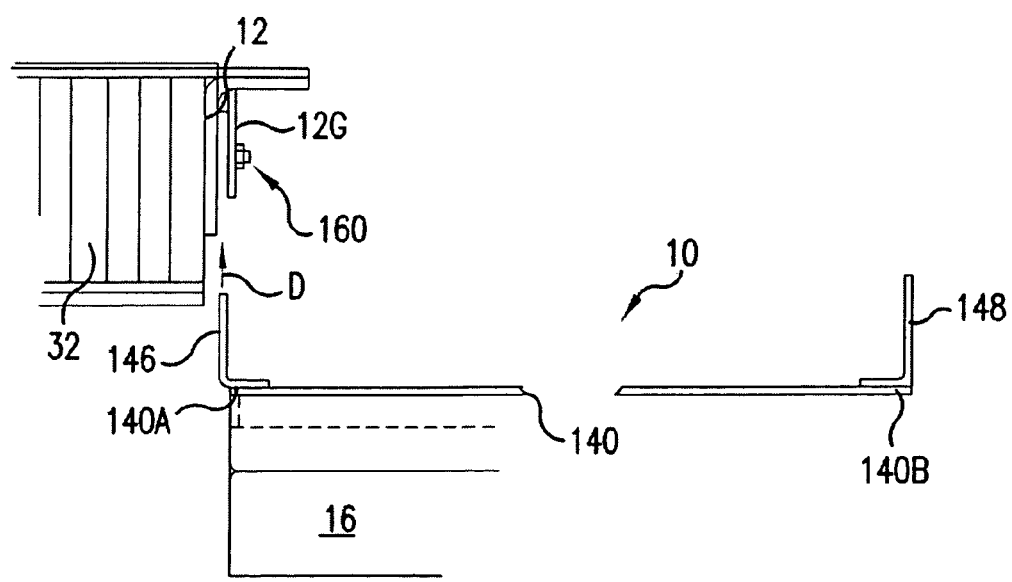
FIG. 6 is a plan view illustrating the movable relationship of the bottom pad assembly relative to a mounting bracket.

As illustrated in FIGS. 5 and 6, the bottom pad assembly 10 includes a bottom pad pan 140 for supporting the bottom pad 16. The bottom pad pan 140 extends between the first mounting bracket 12 and the second mounting bracket 14, not illustrated, and is mounted relative thereto for selectively being vertically moved for manually positioning the bottom pad 16 at a proper elevation relative to a vehicle parked at a loading dock 11. As illustrated in FIG. 5, the arrows A, B and C illustrate the direction of movement of the bottom pad pan 140 relative to the first mounting bracket 12. The first mounting bracket 12 includes a mounting member 12G for forming a receiving opening for accommodating a first flange member 146 and for retaining the first flange member 146 relative thereto by means of a bolt 160 or any suitable fastening mechanism. The second mounting bracket 14 includes a similar attaching mechanism for securing the bottom pad pan 140 to the second mounting bracket 14. As illustrated in FIG. 6 the arrow D illustrates the direction of movement of the bottom pad assembly 10 relative to the first mounting bracket 12.

The bottom pad pan 140 includes a top angle 142 and a bottom angle 144. The top angle 142 is mounted relative to an upper portion 16A of the bottom pad 16 and the bottom angle 144 is mounted relative to a lower portion 16B of the bottom pad 16.

A first flange member 146 is secured to a first end 140A of the bottom pad pan 140 and a second flange member 148 is secured to a second end 140B of the bottom pad pan 140. The first flange member 146 is adapted to be mounted relative to the first mounting bracket 12 and the second flange member 148 is adapted to be mounted relative to said second mounting bracket 14.

As illustrated in FIGS. 2 and 3, the bottom pad assembly 10 includes a bottom draft plug 40 movably positioned with the clearance space 18 for normally sealing a lower portion 42 of the clearance space 18. The bottom draft plug 40 is selectively displaced from the lower portion 42 by a lowered leveler lip or manual tool from above for removing debris disposed within said clearance space.

As illustrated in FIG. 2, the bottom pad assembly 10 includes a first elastic cord member 152 secured to a first end 40A of the bottom draft plug 40 and a second elastic cord member 154 secured to a second end 40B of the bottom draft plug 40 for selectively raising the bottom draft plug 40 into the lower position for reducing air infiltration within said clearance space.

Figure 7:
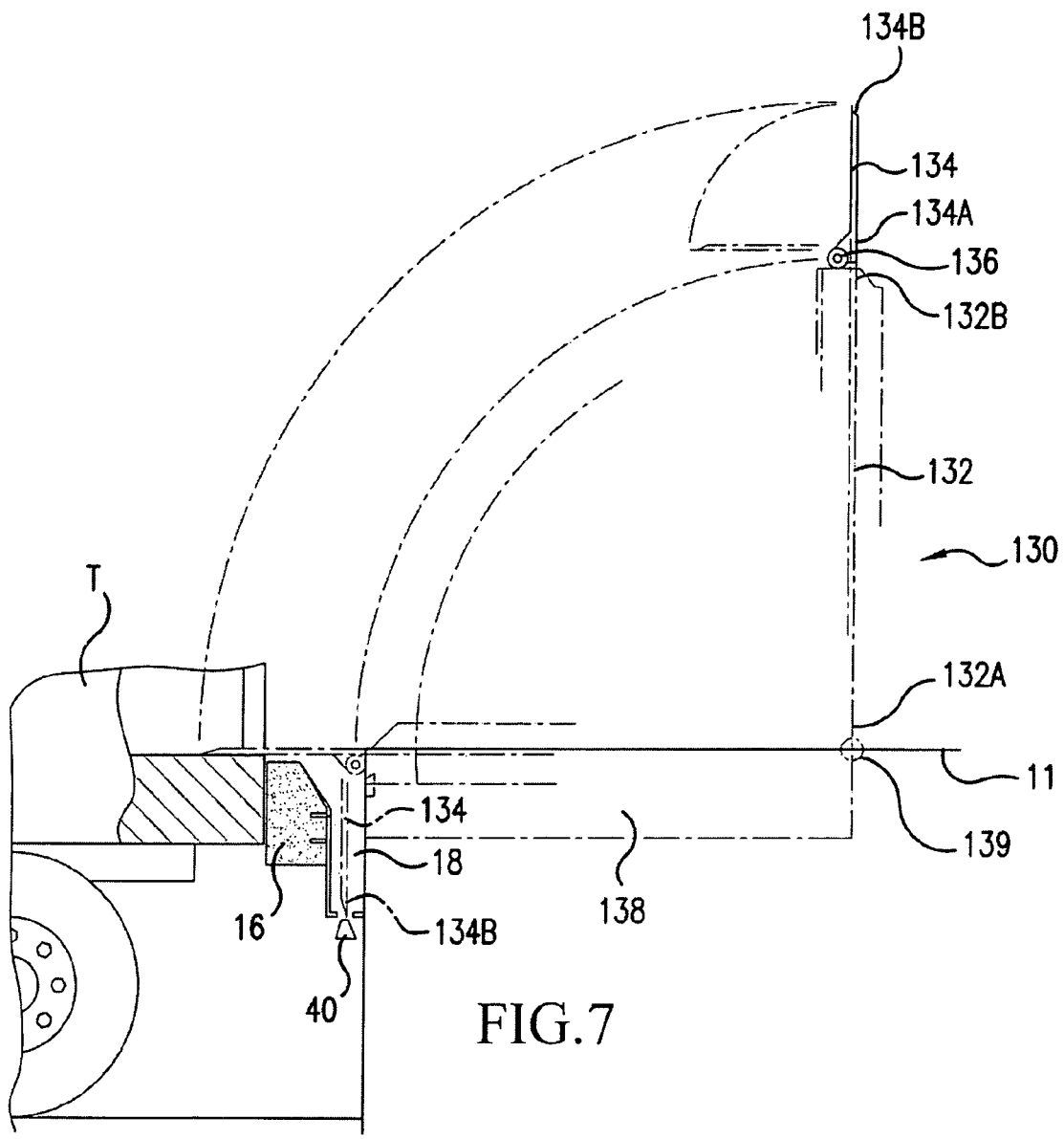
FIG. 7 is a side view similar to FIG. 4 wherein a truck is positioned adjacent to the bottom pad assembly and the leveler.
Figure 8:
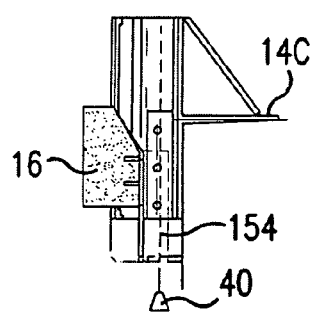
FIG. 8 is a side view similar to FIG. 3 wherein the plug 40 is displaced from the clearance space 18.

As illustrated in FIG. 7, the truck T is positioned adjacent to the bottom pad 16 with the leveler lip portion 134 being positioned within the truck body when the truck is not full. When the truck T is full loaded, the leveler lip portion 134 is pivoted about the hinge 136 to be disposed within the clearance space 18. FIG. 8 illustrated the plug 40 being displaced from the clearance space 18 to permit the removal of debris disposed within the clearance space 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bottom pad and leveler assembly for a loading dock comprising:

a first mounting bracket adapted to be positioned adjacent to a first end of a dock opening;

a second mounting bracket adapted to be positioned adjacent to a second end of the dock opening, the second end being displaced a predetermined distance relative to the first end;

a bottom pad extending between the first mounting bracket and the second mounting bracket for engaging a rear portion of a vehicle parked adjacent to the loading dock, said bottom pad being vertically adjustable relative to said first mounting bracket and said second mounting bracket;

a leveler for facilitating the loading and unloading of the vehicle when the vehicle is parked adjacent to a loading dock, said leveler including a ramp portion and a leveler lip pivotally mounted relative to the ramp portion on a distal end thereof for extending into the vehicle when the vehicle is not full; and a clearance space formed between the bottom pad and the loading dock, said clearance space is adapted to selectively receive the leveler lip of the leveler when the leveler lip is pivoted downwardly to be positioned within the clearance space for facilitating the loading and unloading of the vehicle when the vehicle is full and the leveler lip is not able to be lowered into the vehicle.

2. The bottom pad and leveler assembly according to claim 1, wherein said first mounting bracket includes a first flange adapted to be mounted on the loading dock and said second mounting bracket includes a second flange adapted to be mounted on the loading dock, said bottom pad extending between said first mounting bracket and said second mounting bracket.

3. The bottom pad and leveler assembly according to claim 1, and further including a first bumper mounted adjacent to said first mounting bracket and a second bumper mounted adjacent to said second mounting bracket, said bottom pad extending outwardly from said first and second bumpers for providing a resilient engagement with the vehicle parked adjacent to the loading dock for forming a seal therebetween.

4. The bottom pad and leveler assembly according to claim 1, and further including a bottom draft seal movably positioned within said clearance space for normally sealing a lower portion of said clearance space and for selectively being displaced from said lower portion for removing debris disposed within said clearance space.

5. The bottom pad and leveler assembly according to claim 1, and further including a bottom pad pan for supporting said bottom pad, said bottom pad pan extending between said first mounting bracket and said second mounting bracket and being mounted relative thereto for selective vertical movement for manually positioning said bottom pad at a proper elevation relative to the vehicle parked at the loading dock.

6. The bottom pad and leveler assembly according to claim 5, wherein said bottom pad pan includes a top angle and a bottom angle, said top angle is mounted relative to an upper portion of said bottom pad and said bottom angle is mounted relative to a lower portion of said bottom pad.

7. The bottom pad and leveler assembly according to claim 5, and further including a first flange member secured to a first end of said bottom pad pan and a second flange member secured to a second end of said bottom pad pan, said first flange member being adapted to be mounted relative to said first mounting bracket and said second flange member being adapted to be mounted relative to said second mounting bracket.

8. The bottom pad and leveler assembly according to claim 4, and further including a first elastic cord member secured to a first end of said bottom draft seal and a second elastic cord member secured to a second end of said bottom draft seal for selectively raising said bottom draft seal into said lower portion of said clearance space for reducing air infiltration within said clearance space.

9. A bottom pad and leveler assembly for a loading dock comprising:

a bottom pad adapted to be positioned to span an opening in the loading dock, said bottom pad disposed relative to a floor surface of the loading dock for engaging a rear portion of a vehicle parked adjacent to the loading dock, said bottom pad being vertically adjustable relative to said first mounting bracket and said second mounting bracket;

a leveler for facilitating the loading and unloading of the vehicle when the vehicle is parked adjacent to the loading dock, said leveler including a ramp portion and a leveler lip pivotally mounted relative to the ramp portion on a distal end thereof for extending into the vehicle when the vehicle is not full; and a clearance space formed between the bottom pad and the loading dock, said clearance space is adapted to selectively receive the leveler lip of the leveler when the leveler lip is pivoted downwardly to be positioned within the clearance space for facilitating the loading and unloading of the vehicle when the vehicle is full and the leveler lip is not able to be lowered into the vehicle.

10. The bottom pad and leveler assembly according to claim 9, and further including a first mounting bracket having a first flange adapted to be mounted on the loading dock and a second mounting bracket having a second flange adapted to be mounted on the loading dock, said bottom pad extending between said first mounting bracket and said second mounting bracket.

11. The bottom pad and leveler assembly according to claim 10, and further including a first bumper mounted adjacent to said first mounting bracket and a second bumper mounted adjacent to said second mounting bracket, said bottom pad extending outwardly from said first and second bumpers for providing a resilient engagement with the vehicle parked adjacent to the loading dock for forming a seal therebetween.

12. The bottom pad and leveler assembly according to claim 9, and further including a bottom draft seal movably positioned within said clearance space for normally sealing a lower portion of said clearance space and for selectively being displaced from said lower portion for removing debris disposed within said clearance space.

13. The bottom pad and leveler assembly according to claim 9, and further including a bottom pad pan for supporting said bottom pad, said bottom pad pan extending between said first mounting bracket and said second mounting bracket and being mounted relative thereto for selective vertical movement for manually positioning said bottom pad at a proper elevation relative to the vehicle parked at the loading dock.

14. The bottom pad and leveler assembly according to claim 13, wherein said bottom pad pan includes a top angle and a bottom angle, said top angle is mounted relative to an upper portion of said bottom pad and said bottom angle is mounted relative to a lower portion of said bottom pad.

15. The bottom pad and leveler assembly according to claim 13, and further including a first flange member secured to a first end of said bottom pad pan and a second flange member secured to a second end of said bottom pad pan, said first flange member being adapted to be mounted relative to said first mounting bracket and said second flange member being adapted to be mounted relative to said second mounting bracket.

16. The bottom pad and leveler assembly according to claim 12, and further including a first elastic cord member secured to a first end of said bottom draft seal and a second elastic cord member secured to a second end of said bottom draft seal for selectively raising said bottom draft seal into said lower portion of the clearance space for reducing air infiltration within said clearance space.

17. The bottom pad and leveler assembly according to claim 12, wherein said bottom draft seal is selectively pushed down out of said clearance space to allow debris disposed within said clearance space to drop out.

* * * * *